United States Patent [19]
Dixon et al.

[11] Patent Number: 6,035,252
[45] Date of Patent: Mar. 7, 2000

[54] ENGINE TORQUE CONTROL

[75] Inventors: Jon Dixon, Maldon; Garon Nigel Heslop, Billericay, both of United Kingdom

[73] Assignee: Ford Global Technologies, Inc., Dearborn, Mich.

[21] Appl. No.: 09/163,119

[22] Filed: Sep. 29, 1998

[30] Foreign Application Priority Data

Sep. 30, 1997 [GB] United Kingdom ................... 9720742

[51] Int. Cl.[7] ............................ G01L 3/00; G01M 15/00
[52] U.S. Cl. ........................................ 701/102; 73/117.3
[58] Field of Search .................................. 701/101, 102, 701/110, 115; 73/116, 117.3

[56] References Cited

U.S. PATENT DOCUMENTS

| | | | |
|---|---|---|---|
| 5,010,866 | 4/1991 | Ohata | 123/352 |
| 5,484,351 | 1/1996 | Zhang et al. | 477/113 |
| 5,771,482 | 6/1998 | Rizzoni | 701/101 |
| 5,866,809 | 2/1999 | Söderman | 73/117.3 |

*Primary Examiner*—Andrew M. Dolinar
*Attorney, Agent, or Firm*—Allan J. Lippa

[57] ABSTRACT

The present invention relates to an apparatus (1) and a method for quantifying the net torque (28) produced by an internal combustion engine, for example, in a motor vehicle. Nominal gross engine torque (2) and expected torque losses (17,19,21) associated with the engine (102) are estimated. Estimated net torque (28) from the gross engine torque (2) and expected torque losses (17,19,21) are calculated. If it is determined that no power is drawn through the gearbox, a corrective torque loss value (21) corrects the estimated expected torque losses associated with the engine (102)

7 Claims, 2 Drawing Sheets

ENGINE TORQUE CONTROL

FIELD OF THE INVENTION

The present invention relates to an apparatus and a method for quantifying the net torque produced by an internal combustion engine, for example, in a motor vehicle.

BACKGROUND OF THE INVENTION

The net torque produced by an engine, for example, an Otto or a Diesel internal combustion engine, is the total or gross torque produced by the engine, less the sum of internal and external torque losses. Internal losses are dominated by friction between the relatively moving parts of the engine. External losses may be those caused by accessories driven by the engine, such as an alternator, air conditioning unit, power steering unit, and also any torque converter losses from an automatic transmission.

It is desirable to be able to predict the net torque expected from an engine as a function of the driver demand from the accelerator pedal and gearbox setting. For example, an electronic power train control module in a motor car may control a fuel pump and fuel injectors, depending on the driver demand. An estimated net torque is useful, for example, in the control of automatic transmission and drive wheel traction control, so that gear shifts occur at the right time, and the drive wheels maintain friction with the road.

While in principle it is possible to measure and model accurately the expected net torque produced by an engine operating in a steady state condition, in practice different engines of the same type will have slightly different characteristics, and these characteristics will vary depending on a number of factors such as engine age and operation history. Other factors, for example, engine operating parameters that are not normally measured, such as barometric pressure, relative humidity, and ambient temperature, may have an appreciable effect on the engine net torque.

A number of systems have therefore been proposed to measure or estimate the engine net torque. Most of these, however, involve a continuous adjustment of stored parameters used in torque loss calculations, at least during steady state operation of the engine. This modeling approach involves relatively complex circuitry and software in order to achieve an accurate result.

Another system, disclosed in U.S. Pat. No. 5,484,351, uses an adaptive memory to update stored parameters, but only when the engine is in idle, with no driver demand from an accelerator pedal. When a driver demand is present, no calculation is performed to adjust torque values, and it is possible that the torque correction values for the idle condition would not be correct when driver demand is present and engine speed is generally higher. Another feature of this prior art system is that the torque correction is an adjustment to the driver demand signal, and therefore cannot be used as a net torque estimate to achieve better control of drive train components such as a traction control module or an automatic transmission.

It is an object of the present invention to provide a more convenient apparatus and method for estimating the net engine torque, which does not rely on continuous or frequent adjustment of stored parameters used in torque loss calculations.

SUMMARY OF THE INVENTION

The invention provides an apparatus for quantifying the net torque produced by an internal combustion engine from which power may be drawn through a gearbox, comprising: gross torque processing means to estimate a nominal gross engine torque; expected torque loss processing means to estimate expected torque losses associated with the engine; means to calculate an estimated net torque from the gross engine torque and expected torque losses; means to determine an engine acceleration; means to estimate an actual net torque produced by the engine from the determined engine acceleration; and detection means to determine whether or not engine power is drawn through the gearbox; wherein the expected torque loss processing means includes an adaptive memory for holding expected torque loss correction values, said values being generated from a difference between the estimated and actual net torque estimates, and then stored in the adaptive memory if it is determined that engine power is not drawn through the gearbox.

Also, according to the invention, there is provided a method of quantifying the net torque produced by an internal combustion engine from which power may be drawn through a gearbox, comprising the steps of: a) estimating a nominal gross engine torque; b) estimating expected torque losses associated with the engine; c) calculating an estimated net torque from the gross engine torque and expected torque losses; d) determining an engine acceleration; e) estimating an actual net torque produced by the engine from the determined engine acceleration; f) determining whether or not engine power is drawn through the gearbox; g) taking a difference between the actual and net torque estimates, and generating therefrom a torque loss correction value; h) storing the torque loss correction value in an adaptive memory if it has been determined in step (f) that no power is drawn through the gearbox; and i) repeating the above steps, and when performing step (b), retrieving from the adaptive memory a corrective torque loss value and using this to correct the estimated expected torque losses associated with the engine.

The term "associated with the engine", in the context of torque losses, means torque losses inherent to the engine such as those owing to friction, and, optionally, also any losses owing to accessories powered by the engine such as an alternator, air conditioning unit, and, optionally, where an automatic gearbox is present, torque converter losses.

In a steady-state condition, with no power being drawn from the engine through the gearbox, the estimated gross torque should be equal to the estimated external and internal torque losses, in which case the net torque estimate should be zero. If the actual net torque is in fact zero, then the engine will not be accelerating (which term includes decelerating). If, however, there is a discrepancy between the estimated and actual net torques, the engine will be accelerating and from the known inertia of the engine (plus any accessories driven by the engine), this acceleration can be used to calculate a correction factor, which can then be stored adaptively in, for example, a look-up table in an EEPROM or other such non-volatile memory.

The apparatus may therefore be used to correct the net torque estimate whenever the engine is not providing power through the gearbox. In the case of an automatic transmission, the torque losses in the torque converter may be considered to be losses by an accessory, and factored into the torque estimate calculation. If the gearbox is a manual transmission with a clutch, then the detection means may detect whether or not the engine is disengaged from the gears by the clutch in order to determine whether or not engine power is drawn through the gearbox.

The apparatus may comprise means to provide one or more engine condition signals representative of an engine operating parameter. The expected torque loss processing means then receives one or more of the engine condition signals and estimates from this the estimate of expected torque losses associated with the engine. Examples of engine operating parameters include engine temperature and engine speed.

The engine condition signals may include a fuel delivery signal representative of an amount of fuel supplied to the engine. The gross torque processing means may then receive one or more of said signals including at least the fuel delivery signal and estimate from this the nominal gross torque produced by the engine.

In a preferred embodiment, the fuel delivery signal may vary over a range corresponding to a range of driver demands. The apparatus is then arranged to be responsive over this range of fuel delivery signals to store the expected torque loss correction values in the adaptive memory. The advantage of this is that the torque correction need not be limited to a fixed or small range of engine speeds, for example to just the idle speed, but may be calculated over a wide range of engine speeds, thus making the correction generally more accurate over a wide range of engine speeds.

The apparatus according to the invention may be employed as part of the motive means for a motor vehicle, comprising an internal combustion engine and a gearbox from which power may be drawn from the engine. If the engine has an associated fuel delivery system and an engine monitoring system, the fuel delivery signal may conveniently be provided by the fuel delivery system, and the engine condition signals may similarly be provided by the engine monitoring system.

For either a manual or an automatic transmission, it may be desirable for the detection means to detect whether or not the gears are in neutral, in order to determine whether or not engine power is drawn through the gearbox.

In many cases, the engine will be driving accessories such as air conditioning units or an alternator. The apparatus may then comprise additionally means to provide accessory condition signals representative of one or more accessory operating parameters, for example, and on/off indication for an air conditioning unit, or an alternator current. The accessory loss processing means may then receive one or more of the accessory condition signals from which it may estimate expected external torque losses from the accessories driven by the engine. This estimate may then be combined with the expected torque losses internal to the engine in the summation by the summation means.

Because the correction value may fluctuate owing to sensor measurement errors or transient changing in the engine operation condition, such as a misfire, the torque loss correction value is preferably averaged over time prior to being stored in the adaptive memory.

BRIEF DESCRIPTION OF THE DRAWINGS

The invention will now be described further, with reference to the accompanying drawings, in which.

DESCRIPTION OF THE PREFERRED EMBODIMENT

Figure 1:
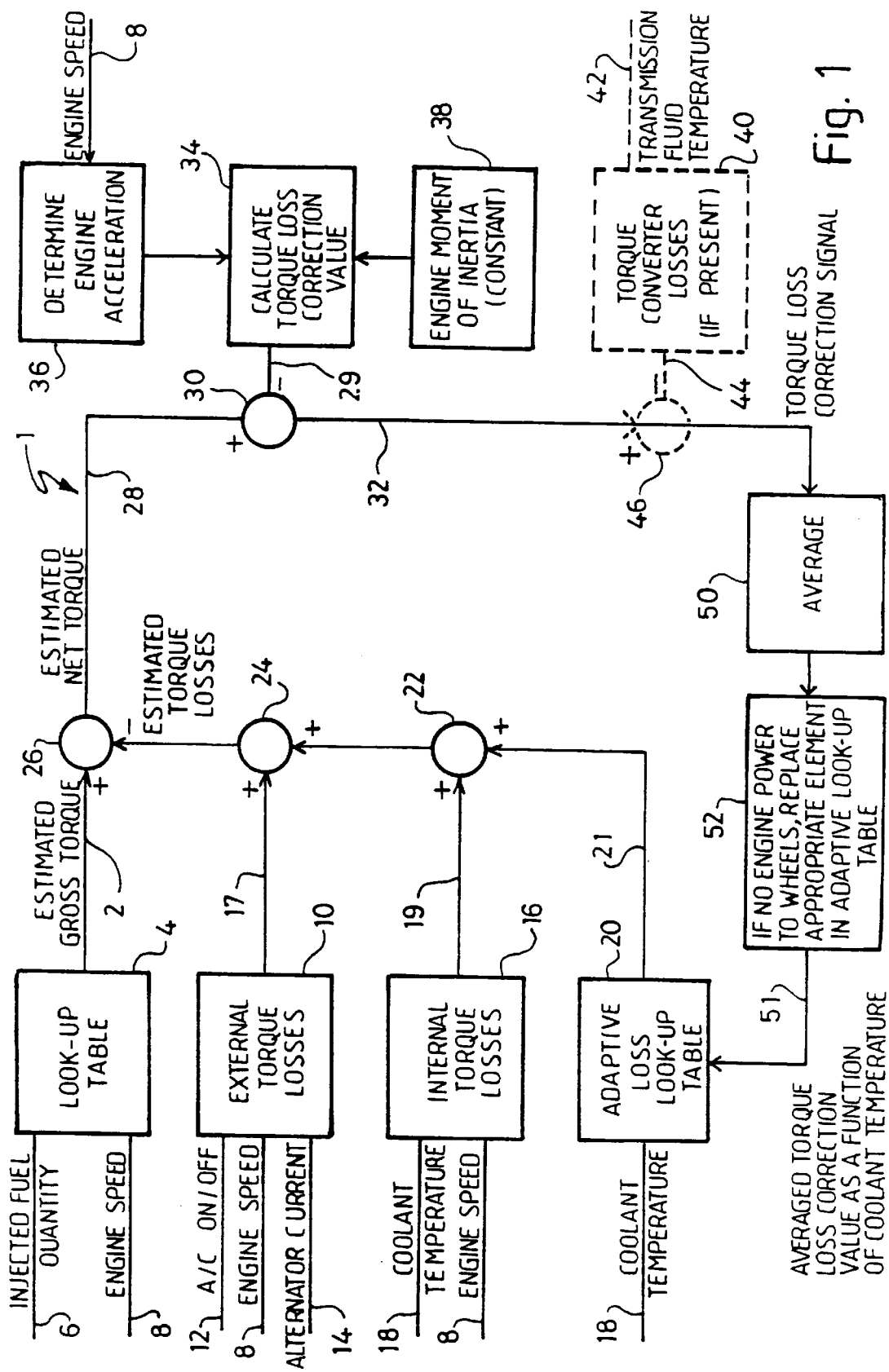
FIG. 1 is a block schematic diagram of an apparatus according to the invention for quantifying the net torque produced by an internal combustion engine from which power may be drawn through a gearbox.

FIG. 1 shows in block schematic form, an apparatus 1 for quantifying the net torque produced by an internal combustion engine. An estimated gross torque 2 is generated in a look-up table 4 as a function of injected fuel quantity 6 and engine speed 8.

In this example, external torque losses are taken to be those from an air conditioning unit and alternator (not shown), both driven by the engine. The load from the air conditioning unit will be fairly constant for a given engine speed, whilst the load from the alternator will depend on the alternator current. An external torque loss estimator 10 therefore receives three signals, engine speed 8, air conditioning on or off 12, and alternator current 14, and produces an output signal for an estimated external torque loss 17.

Internal torque losses will depend mainly on friction within the engine, which are most strongly dependent on engine speed and coolant temperature. An internal torque loss estimator 16 therefore receives inputs signals representing the engine speed 8 and the coolant temperature 18, and produces an output signal for an estimated internal torque loss 19.

Because the estimated external 17 and internal 19 torque losses will generally not be completely accurate, an adaptive loss look-up table 20 provides an output signal for a corrective torque loss 21, to be explained in more detail below. Although the inaccuracies may be due to many sources of error, these errors are generally a function of engine coolant temperature 18, and so the look-up table is arranged to provide a corrective torque loss signal depending upon an input of the coolant temperature 18.

The external, internal and corrective torque loss signals 17,19,21 are summed at nodes 22, 24, and then subtracted from the estimated gross torque at node 26 to produce an estimated net torque signal 28.

If the engine is running disconnected from the drive wheels and in a steady state, i.e., with no engine acceleration, then the estimated net torque should be zero. If the engine is not in a steady-state, for example, with the injected fuel quantity high or low for the particular engine speed, then the engine should be accelerating with either a positive or a negative estimated net torque.

Any discrepancy between the engine acceleration and the estimated net torque under these conditions in which the engine is effectively disengaged from the drive wheels, may therefore be used to calculate an actual net torque 29, which may be subtracted 30 from the estimated net torque 28 to produce a torque loss correction signal 32.

The actual net torque with the engine disengaged from the drive wheels is calculated 34 from a measured engine acceleration 36 and a known constant moment of inertia 38 for the engine (optionally adjusted for any accessories connected to the engine). In this example, the acceleration is calculated using the same engine speed signal 8 as used elsewhere in FIG. 1.

If the engine is connected to an automatic transmission (as shown in phantom outline in FIG. 1), then the gearbox will only occasionally be in the park setting with the engine disconnected from the drive wheels and the torque converter. It is therefore necessary, when the to factor in the torque converter losses, for the cases where the automatic transmission is in neutral, and when the transmission is in gear, but with the vehicle stationary and no power being transmitted to the wheels. In this example, this is done in a torque converter loss estimator 40, based upon an input signal representative of transmission fluid temperature 42. An estimated torque converter torque loss signal 44 is then subtracted 46 from the previously generated torque loss correction signal 32.

The torque converter loss estimator could, of course, equivalently be placed in the section of the figure with the external and internal torque loss, since an automatic transmission results in another form of external torque loss. In that case, the definition of the estimated net torque 28 would be the estimated net torque including torque converter losses. In the illustrated implementation, the torque converter loss estimator 40 is separate so that the circuitry in the case of a manual transmission is kept simple.

The torque loss correction signal is then averaged 50 to reduce noise and transient signals, and then a torque loss correction value 51 is factored back into the adaptive loss look-up table if no engine power is being supplied to the wheels 52.

Figure 2:
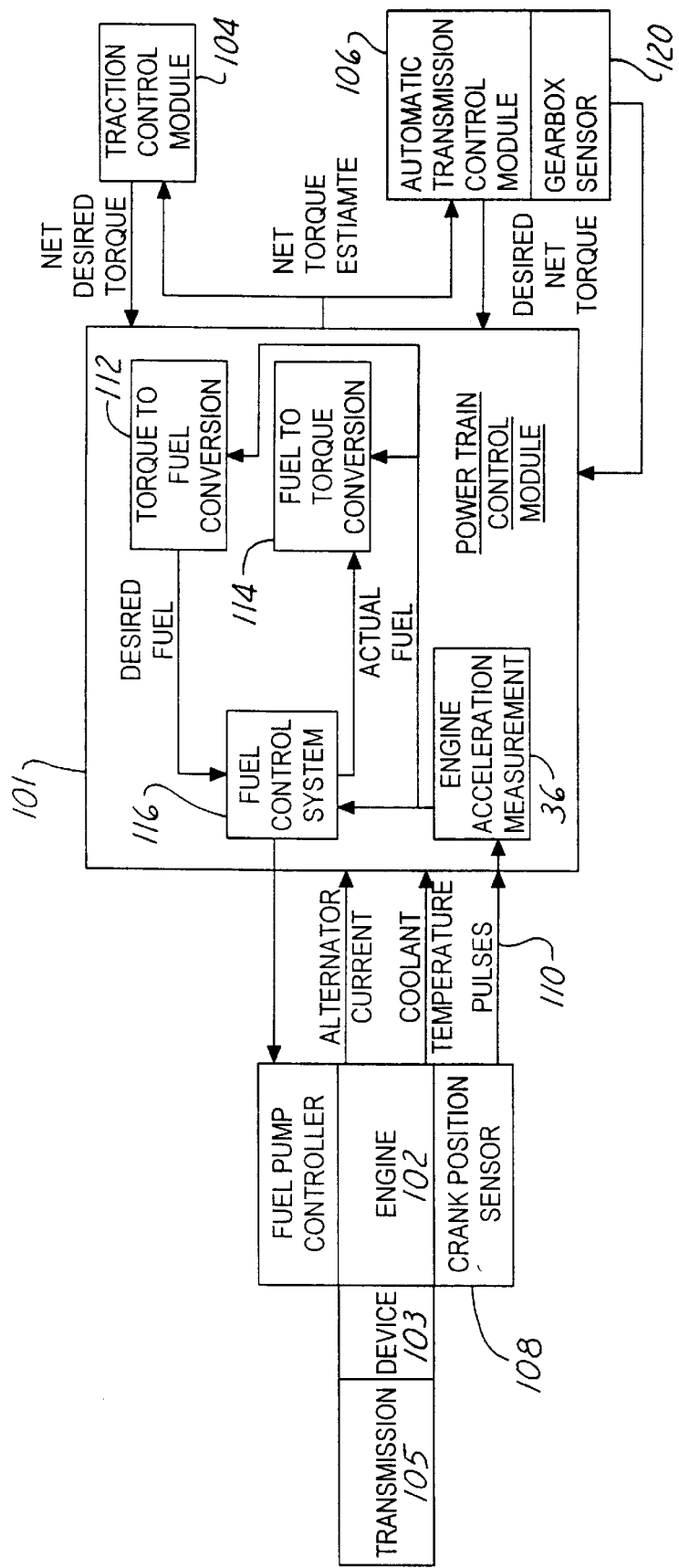
FIG. 2 is a block schematic diagram illustrating the use of the apparatus according to the invention in a power train control module.

FIG. 2 shows how the apparatus 1 described above may be used in a power train control module 101 and with a diesel engine 102 in a vehicle having a traction control module 104 and an automatic transmission control module 106. In this example, engine 102 is coupled to transmission 105 through device 103. If, for example, transmission 105 is an automatic transmission, then device 103 can be a torque converter. If, for example, transmission 105 is a manual transmission, then device 103 can be a clutch.

The engine comprises known means 108 to measure engine speed, which although not illustrated are in the form of a toothed wheel and sensor arrangement on the engine crankshaft. These provide a plurality of pulses 110 for each revolution of the engine 102, to the acceleration determination module 36. The engine acceleration measurement is then used in the manner described above to produce the corrected net torque estimate, which is used in the calculations of fuel-to torque 114 and torque-to-fuel 112 for the fuel control system 116, as well as in the traction control 104 and automatic transmission control 106 modules in which the gearbox includes a sensor to detect if the gear box is in neutral in order to determine whether or not engine power is drawn through the gearbox.

Also part of the automatic transmission control module 106 is a gearbox sensor 120 which detects if the gears are disengaged from the engine in order to determine whether or not engine power is drawn through the gearbox.

The invention may therefore be used to obtain an accurate and convenient control over the fuel control system, according to the demands placed upon the engine by the driver, and the limitation or constraints required by the other controls such as traction control and automatic gearbox operation.

We claim:

1. A method (1) for quantifying the net torque (28) produced by an internal combustion engine (102) from which power may be drawn through a gearbox, comprising:

estimating a nominal gross engine torque (2);
   estimating expected torque losses (17,19,21) associated with the engine (102);
   calculating an estimated net torque (28) from the gross engine torque (2) and expected torque losses (17,19, 21);
   determining an engine acceleration;
   estimating an actual net torque (29) produced by the engine from the determined engine acceleration; and
   determining (52) whether or not engine power is drawn through the gearbox; wherein the expected torque estimation includes holding expected torque loss correction values (51) in an adaptive memory, said values (51) being generated from a difference between the estimated (28) and actual (29) net torque estimates, and then storing in the adaptive memory (20) if it is determined (52) that engine power is not drawn through the gearbox.

2. A method as claimed in claim 1, further comprising a step of providing one or more engine condition signals (6,8,12,14,18) representative of an engine operating parameter, the expected torque loss estimation step (10,16, 20) being responsive to one or more of the engine condition signals (8,12,14,18) and estimating therefrom the estimate of expected torque losses (17,19,21) associated with the engine.

3. A method as claimed in claim 2, in which the engine condition signals (6,8,12,14,18) include a fuel delivery signal (6) representative of an amount of fuel supplied to the engine, the gross torque estimating step being responsive to one or more of said signals including at least the fuel delivery signal (6) and estimating therefrom the nominal gross torque (2) produced by the engine (102).

4. A method as claimed in claim 3, in which the fuel delivery signal (6) may vary over a range corresponding to a range of driver demands, the method being responsive to store the expected torque loss correction values (51) in the adaptive memory (20) over said range of fuel delivery signals.

5. A method claimed in claim 4, in which the step of determining whether engine power is drawn through the gearbox detects whether or not the gears are in neutral in order to determine whether or not engine power is drawn through the gearbox.

6. A method as claimed in claim 5, in which the gearbox is a manual transmission with a clutch, and the step of determining whether engine power is drawn through the gearbox detects whether or not the engine is disengaged from the gears by the clutch in order to determine whether or not engine power is drawn through the gearbox.

7. A method of quantifying the net torque produced by an internal combustion engine (102) from which power may be drawn through a gearbox, comprising the steps of:

a) estimating (4) a nominal gross engine torque (2);
   b) estimating (10,16,20) expected torque losses (17,19, 21) associated with the engine (102);
   c) calculating (26) an estimated net torque (28) from the gross engine torque (2) and expected torque losses (17,19,21);
   d) determining (36) an engine acceleration;
   e) estimating (34,36,38) an actual net torque (29) produced by the engine (102) from the determined engine acceleration;
   f) determining (52) whether or not engine power is drawn through the gearbox;
   g) taking a difference between the actual (29) and net (28) torque estimates, and generating (30) therefrom a torque loss correction value (32,51);
   h) storing the torque loss correction value (51) in an adaptive memory (20) if it has been determined in step (f) that no power is drawn through the gearbox; and
   i) repeating the above steps, and when performing step (b), retrieving from the adaptive memory (20) a corrective torque loss value (21) and using this to correct the estimated expected torque losses associated with the engine (102).

* * * * *